June 18, 1929.  H. F. WOLVERTON  1,717,644

FOOD HOLDER

Filed Oct. 15, 1927

INVENTOR
Henrietta F Wolverton
BY
ATTORNEY

Patented June 18, 1929.

1,717,644

UNITED STATES PATENT OFFICE.

HENRIETTA F. WOLVERTON, OF SALEM, OREGON.

FOOD HOLDER.

Application filed October 15, 1927. Serial No. 226,382.

This invention relates to food holders and has as one of its objects to provide a food holder that is relatively small in size and convenient to handle.

Another object of the invention is to provide a food holder that may be constructed of any resilient material, the slight resiliency being necessary permitting the use of exceptionally light metal or certain qualities of other materials such as light fibre board, and hence is exceptionally cheap to manufacture.

Another object of the invention is to provide a food holder whose size and shape renders it a dainty tool.

A further object of the invention is to provide a food holder whose arms have dimensions for limited advertising space for use as an advertising medium.

A further object of the invention is to provide a food holder that is highly efficient in operation.

With these, and other objects in view, reference is now had to the accompanying drawings in which Fig. 1 represents a layout of the device;

Figure 3:
Fig. 3 is a rear end elevation of the device.
Figure 4:
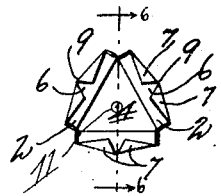
Fig. 4 is a front end elevation of the device.
Figure 2:
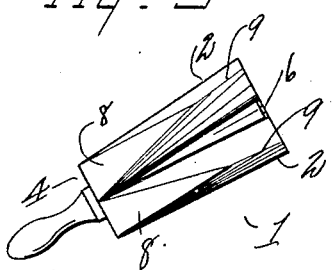
Fig. 2 is a side elevation thereof modified by the inclusion of a handle.
Figure 1:
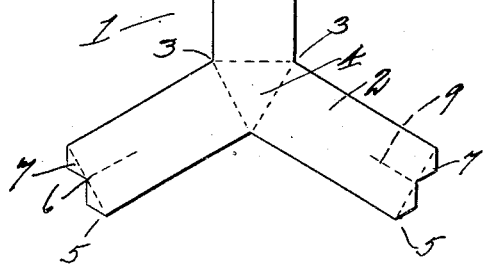
Figure 5:
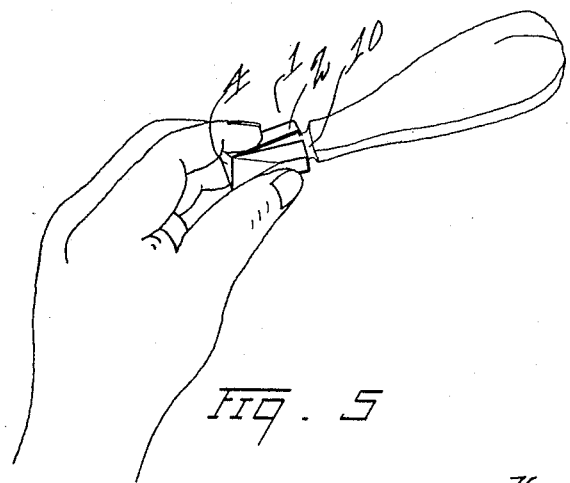
Fig. 5 is a perspective view showing the application of the device.
Figure 6:
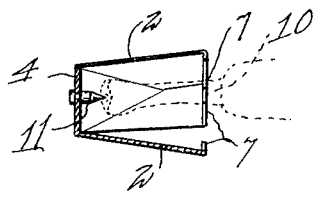
Fig. 6 is a sectional elevation of the device, taken on the line 6—6 of Fig. 4.

Having reference to the drawings, like numerals refer to like parts throughout the several views and the numeral 1 refers to the device as a whole which consists generally of a figure having three arms 2 forming three equal angles 3, the arms 2 being extended from and forming a base 4 which is inherently of triangular form, and the free ends 5 of the arms are notched, as shown at 6 to provide teeth 7, and the whole is constructed of a resilient material, for a purpose to be explained.

This description covers the layout, it being intended to provide a device that may be constructed by a simple stamping operation, and furnished preferably in the flat with the teeth 7 only bent at nearly right angles.

By this means numbers of the devices may be readily nested into a compact assembly for shipping purposes, and the advertising may be printed thereon in the flat, and the device finally shaped by the fingers of the user at the time of use. Shaping consists of bending said arms 2 inward towards a common center, forming with the yielding material a structure whose arms normally tend to diverge, still forming sides 8 to said base 4, completely covering the held food and thus preventing it from soiling the hands, and forming with the teeth directed toward the common center a highly efficient gripping means.

In use the device may be formed to shape as above mentioned, or obviously forming may be accomplished by mechanical means, and in either event the above mentioned notches 6 will readily permit a longitudinal stiffening bend or curvature 9 to be incorporated in the arms opposite said notches 6.

With the device thus formed, and the yielding qualities of the material normally maintaining the jaws in an open position, the device may be readily passed over bones 10 or asparagus tips, or other articles of food of a like nature, when by the natural pressure of the fingers the device will seize the food as securely as would the fingers, i. e. the triangular arrangement of the prongs by their points of contact, will provide for rigid securement of the food, preventing pivotal movement of the holder at the point of union.

It is now obvious that the device is adapted to many kinds of food and that for larger food, such as corn on the cob or other like food a larger food holder may be supplied.

It is also obvious that the holder, even of the size necessary to hold corn, may be constructed of the precious metals for individual use, if desired, when its size will permit being carried in the pocket or other receptacles for that purpose.

If desired a pin 11 may be added centrally on the inside of the base to pierce the end of the inserted food, the better to secure the food in the device.

Having thus described my invention, I claim:

1. A food holder comprising a closed base, prongs arranged to prevent pivotal action of the holder at the point of union with the food, and formed on said base for yielding action, and gripping parts formed on said prongs.

2. A food holder comprising a resilient material having three arms forming equal angles, said arms being provided on their free ends with teeth, and said arms and teeth being bent inward toward a common center and forming a yielding gripping structure.

3. A food holder comprising a resilient material having three arms disposed to form equal angles, said arms having their free ends notched providing teeth, said arms and teeth being bent inward toward a common center and forming a yielding gripping structure, and said arms provided with a longitudinal stiffening bend opposite said notches.

4. A food holder comprising a single piece of resilient material having a base and three arms extended from said base at equal angles, said arms having their free end notches to form teeth, said arms being bent inward toward a common center and forming a yielding structure, and forming sides to said base, and said teeth being bent inward to form a gripping means.

5. A food holder comprising a single piece of resilient material having a base and arms extended from said base, said arms having their free ends notched to form teeth, and to provide for a free bending, longitudinally, of the arms, for stiffening purposes, said arms being bent inward toward a common center and forming with said base a yielding structure, and forming sides to said base, said teeth being bent inward to form a gripping means, and a pin centrally mounted in said base.

In testimony whereof I affix my signature.

HENRIETTA F. WOLVERTON.